United States Patent [19]

Steele

[11] Patent Number: 4,633,828

[45] Date of Patent: Jan. 6, 1987

[54] ADJUSTABLE POLAR POINT MOUNT

[76] Inventor: Luther R. Steele, 4404 Briarhaven Rd., Fort Worth, Tex. 76109

[21] Appl. No.: 740,758

[22] Filed: Jun. 3, 1985

[51] Int. Cl.$^4$ ............................................. F02B 77/00
[52] U.S. Cl. .............................. 123/195 A; 123/198 R
[58] Field of Search ........................ 123/195 A, 198 R

[56] References Cited

U.S. PATENT DOCUMENTS 3,362,243  1/1968  Ferguson ..................... 123/195 A
3,730,147  5/1973  Buchwald ..................... 123/195 A
4,215,658  8/1980  Smith, Jr. et al. ............. 123/195 A Primary Examiner—Ira S. Lazarus

[57] ABSTRACT

A "U"-shaped polar bracket mounted on an automotive engine block has two curved slots at each end. A polar extension having two legs of unequal length is attached to the polar bracket. An automotive accessory is connected to the apex or polar point of the polar extension. This combination of elements allows great flexibility in the mounting position of the automotive accessory.

1 Claim, 7 Drawing Figures

U.S. Patent   Jan. 6, 1987   4,633,828
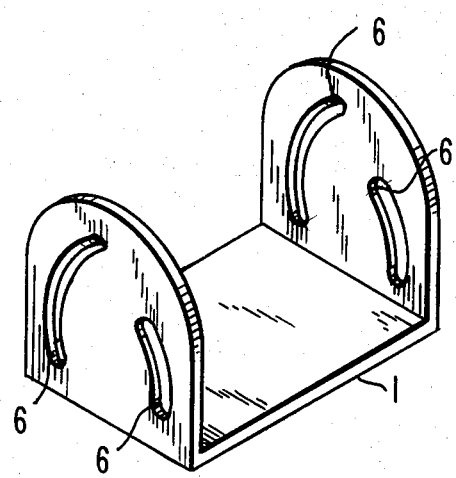
FIG.1
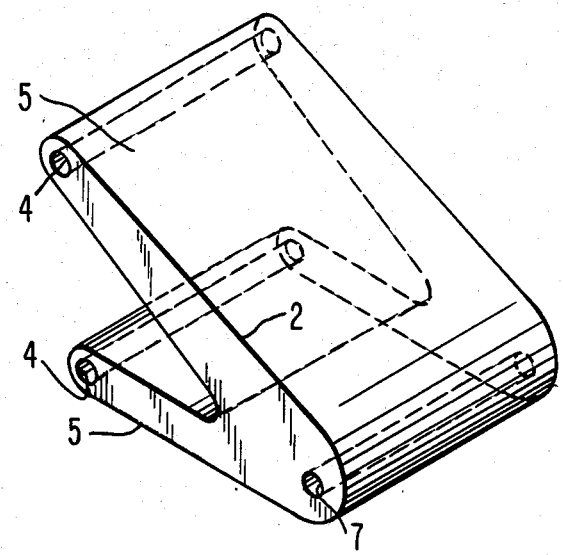
FIG.2
FIG.4
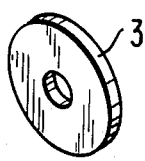
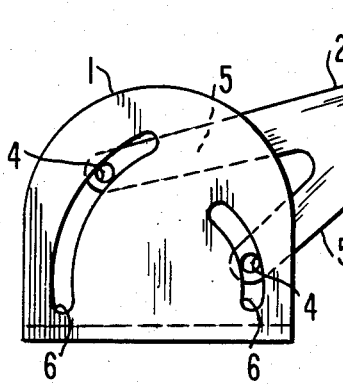
FIG.5
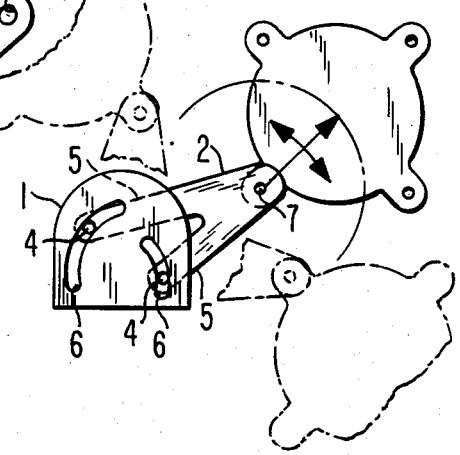
FIG.3
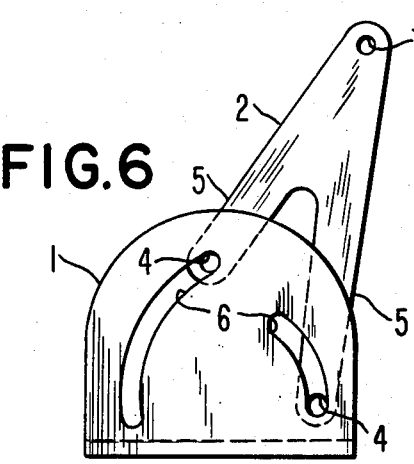
FIG.6
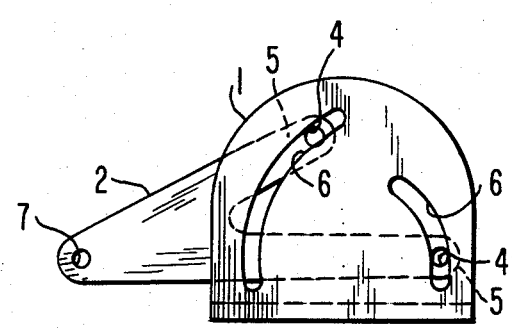
FIG.7

ADJUSTABLE POLAR POINT MOUNT

BACKGROUND OF THE INVENTION

FIELD OF THE INVENTION

This invention provides an improved device for mounting automotive engine accessories such as compressors, generators or alternators on an automotive engine block.

SUMMARY OF THE INVENTION

This invention provides a "U"-shaped polar bracket with two curved slots in each of its ends, and a polar extension comprising two legs of unequal length having cylindrical bores near their ends. The polar extension is connected to the polar bracket by two threaded rods which pass through the curved slots on the polar bracket and through the cylindrical bores near the ends of the legs of the polar extension. These connections are secured by screwing nuts onto the ends of the threaded rods and tightening them against the ends of the polar brackets. The polar extension, at its apex, furthermore provides a third cylindrical bore, referred to as the polar point, to which an automobile accessory is connected by a third threaded rod which passes through two mounting lugs on the accessory being mounted and through the cylindrical bore at the polar point of the polar extension. This connection is secured by screwing nuts onto the ends of the threaded rod and tightening these.

BRIEF DESCRIPTION OF THE DRAWINGS

FIG. 1 is a perspective view of a polar bracket shown in accordance with the present invention;

FIG. 2 is a perspective view of a polar extension of the invention;

FIG. 3 is a front elevational view of the invention showing the adjustable polar point mountings;

FIG. 4 is a perspective view of an optional spacer;

FIG. 5 is a front elevational view of a typical position of mount;

FIG. 6 is a front elevational view of another position, and

FIG. 7 is a front elevational view of yet another position.

DETAILED DESCRIPTION

This invention provides a "U"-shaped polar bracket 1 and a polar extension 2 illustrated by FIGS. 1 and 2, respectively.

FIGS. 3-7 illustrate a number of ways in which these elements may be assembled to provide great flexibility in mounting automotive engine accessories, such as air conditioning compressors, generators or alternators on an automotive engine block.

Polar bracket 1 is mounted on the engine block by conventional means. Polar extension 2 is connected with polar bracket 1 by passage of threaded rods through the curved slots 6 on the polar bracket 1 and through the cylindrical bores 4 near the ends of legs 5 of the polar extension 2. The freedom of movement of these connections in the curve slots 6 provides great flexibility in positioning the polar point 7 before the connections are secured by tightening nuts on the ends of the threaded rods.

The automotive accessory to be mounted is then attached to the polar point 7 by passage of a third threaded rod through the mounting lugs on the accessory and through the cylindrical bore at the polar point 7 of the polar extension. This connection is secured by nuts screwed onto the ends of said third threaded rod and tightened against the mounting lugs of the accessory.

Flat washers or lock washers may be used in making all the above connections. Spacers 3 may furthermore be provided for adjustment of the accessory's mounting position in a longitudinal direction. All pivot points of the polar extension provide an interception point of two or more planes.

While various changes may be made in the detail construction, it is understood that such changes will be within the spirit and scope of the present invention, as is defined by the appended claims.

What I now claim is:

1. An assembly for mounting automotive accessories, such as a compressor, generator or alternator on an engine block, comprising, in combination, a "U"-shaped polar bracket, a polar extension and a pair of threaded rods adjustably mounting said extension on said bracket; said bracket comprising a central portion for resting against said engine block and parallel legs at opposite ends thereof for receiving said extension therebetween, a pair of arcuate slots in each said leg, one said slot being longer than the other, said longer slots of both said legs being aligned together and said other slots of both said legs being likewise aligned together, a pair of threaded rods supporting said extension having opposite ends received through said slots and a nut on each rod end for affixing the position of each said rod, and said extension comprising two straight wide arms at acute angle respective to each other and joined together at their one ends, one said arm being longer than the other, a longitudinal opening through each terminal end of said arms receiving said rods therethrough, and a third longitudinal opening parallel to the said first opening being through said joined ends of said arms for a third threaded rod extending through mounting lugs of said accessories.

* * * * *